(12) United States Patent
Fisher et al.

(10) Patent No.: US 7,730,065 B2
(45) Date of Patent: Jun. 1, 2010

(54) FILE FORMATS FOR EXTERNAL SPECIFICATION OF OBJECT-RELATIONAL MAPPING

(75) Inventors: Jomo Ahab Fisher, Redmond, WA (US); Anders Hejlsberg, Seattle, WA (US); Dinesh Chandrakant Kulkarni, Sammamish, WA (US); Henricus Johannes Maria Meijer, Mercer Island, WA (US); Matthew J. Warren, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 373 days.

(21) Appl. No.: 11/846,249

(22) Filed: Aug. 28, 2007

(65) Prior Publication Data
US 2009/0063555 A1  Mar. 5, 2009

Related U.S. Application Data

(60) Provisional application No. 60/914,496, filed on Apr. 27, 2007.

(51) Int. Cl.
*G06F 17/30* (2006.01)
(52) U.S. Cl. ...................................... 707/736
(58) Field of Classification Search ................ 707/1, 707/2, 100, 103 R, 736; 712/4
See application file for complete search history.

(56) References Cited

U.S. PATENT DOCUMENTS

| 5,842,198 | A  | * | 11/1998 | Suzuki et al. ................ 707/2 |
| 7,386,703 | B2 | * | 6/2008 | Sandon et al. ............... 712/4 |
| 7,596,416 | B1 | * | 9/2009 | Maluf et al. ................. 700/1 |
| 2005/0149555 | A1 | * | 7/2005 | Wang et al. ............. 707/103 R |
| 2006/0190478 | A1 | * | 8/2006 | Owens et al. .............. 707/102 |
| 2006/0271568 | A1 | * | 11/2006 | Balkir et al. .............. 707/100 |

\* cited by examiner

*Primary Examiner*—Etienne P LeRoux
(74) *Attorney, Agent, or Firm*—Workman Nydegger

(57) ABSTRACT

A unique formatting scheme for object-relational mapping allows disparate applications that adopt the scheme to seamlessly access data in disparate relational databases. The formatting scheme contemplates a common format that conveys the mapping information through (i) attributes embedded with code objects, and (ii) an external mapping source. Adoption of the common format can result in several advantages for network-based client-server operations: (i) Software developers can continue programming in their existing languages. (ii) Data servers from various vendors can also continue to be developed and managed in the vendors' core programming languages. (iii) Vendors that employ client applications which have adopted the common format can consistently use various data warehouses without incurring customization costs.

19 Claims, 10 Drawing Sheets

CLASS MAPPING ATTRIBUTES

| PROVIDER | |
|---|---|
| PROVIDER | TYPE |

| DATABASE | |
|---|---|
| NAME | STRING |

| TABLE | |
|---|---|
| NAME | STRING |

| COLUMN | |
|---|---|
| NAME | STRING |
| STORAGE | STRING |
| DBTYPE | STRING |
| EXPRESSION | STRING |
| CANBENULL | BOOLEAN |
| ISPRIMARYKEY | BOOLEAN |
| ISDBGENERATED | BOOLEAN |
| ISVERSION | BOOLEAN |
| ISDISCRIMINATOR | BOOLEAN |
| UPDATECHECK | UPDATECHECK |

| ASSOCIATION | |
|---|---|
| NAME | STRING |
| STORAGE | STRING |
| THISKEY | STRING |
| OTHERKEY | STRING |
| ISUNIQUE | BOOLEAN |
| ISFOREIGNKEY | BOOLEAN |

| INHERITANCE | |
|---|---|
| CODE | STRING |
| TYPE | TYPE |
| ISDEFAULT | BOOLEAN |

FIG. 4

FILE FORMATS FOR EXTERNAL SPECIFICATION OF OBJECT-RELATIONAL MAPPING

CROSS REFERENCE TO RELATED APPLICATION

This application claims the benefit of U.S. Provisional Application Ser. No. 60/914,496, entitled "FILE FORMATS FOR EXTERNAL SPECIFICATION OF OBJECT-RELATIONAL MAPPING" and filed on Apr. 27, 2007, the entirety of which is incorporated herein by reference.

TECHNICAL FIELD

Innovation relates to information technology and processing, with emphasis on relational databases and a framework to generate object-relational mappings.

BACKGROUND

Relational databases are a cornerstone of modern information technology and its applications. Network-based purchase and billing systems, shipment and inventory tracking, technical literature services, as well as universities and research laboratories institutional information are a few examples of the relevance of relational databases. The ability to access and manipulate information in relational databases seamlessly with respect to the particular tools (e.g., software applications and languages) used to conduct the manipulation becomes essential to the success of the tasks that rely on these databases.

To accomplish a specific network-based task, such as purchasing an airline ticket or tracking inventory, disparate distributed third-party applications based on disparate computer languages demand accessing and manipulating a common set of data stored in a common relational database. Software providers write software applications to handle massive relational databases. However, achieving uniform and seamless access and manipulation of data in a common database would require a framework capable of mapping objects in the code of the third-party applications to data in the common database. Thus, the focus of dealing with relational databases is gradually shifting toward achieving a seamless object-relational mapping that is inert to the implementation language of the application that needs access to the database, or the language in which the database is implemented and managed.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

This innovation presents a unique type of formatting scheme for common object-relational mapping that allows disparate client applications that adopt the scheme to seamlessly manipulate and access data in disparate relational databases. The mapping information can be specified by attributes associated with objects (e.g., classes) of the programming language of a client application, or it can be supplied as an external source. Attributes provide the simplest way to get started and express most common mappings. Attributes also are the base of external mapping. It is noted that besides mapping information, the external mapping source contains a metadata description of the relational database against which the mapping is defined.

The unique formatting scheme described hereinafter has several desirable implications related to network-based tasks that depend on disparate distributed client applications that access and manipulate a common relational database: (i) Software developers can continue programming in their existing languages. (ii) Data servers from various vendors can also continue programming in their core languages. (iii) Vendors that employ client applications which have adopted the common format can consistently use various data warehouses without incurring customization costs.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

BRIEF DESCRIPTION OF DRAWINGS

FIG. 4 illustrates a catalog of attributes that support attribute-based object-relational mapping.

DETAILED DESCRIPTION OF INVENTION

Figure 1:
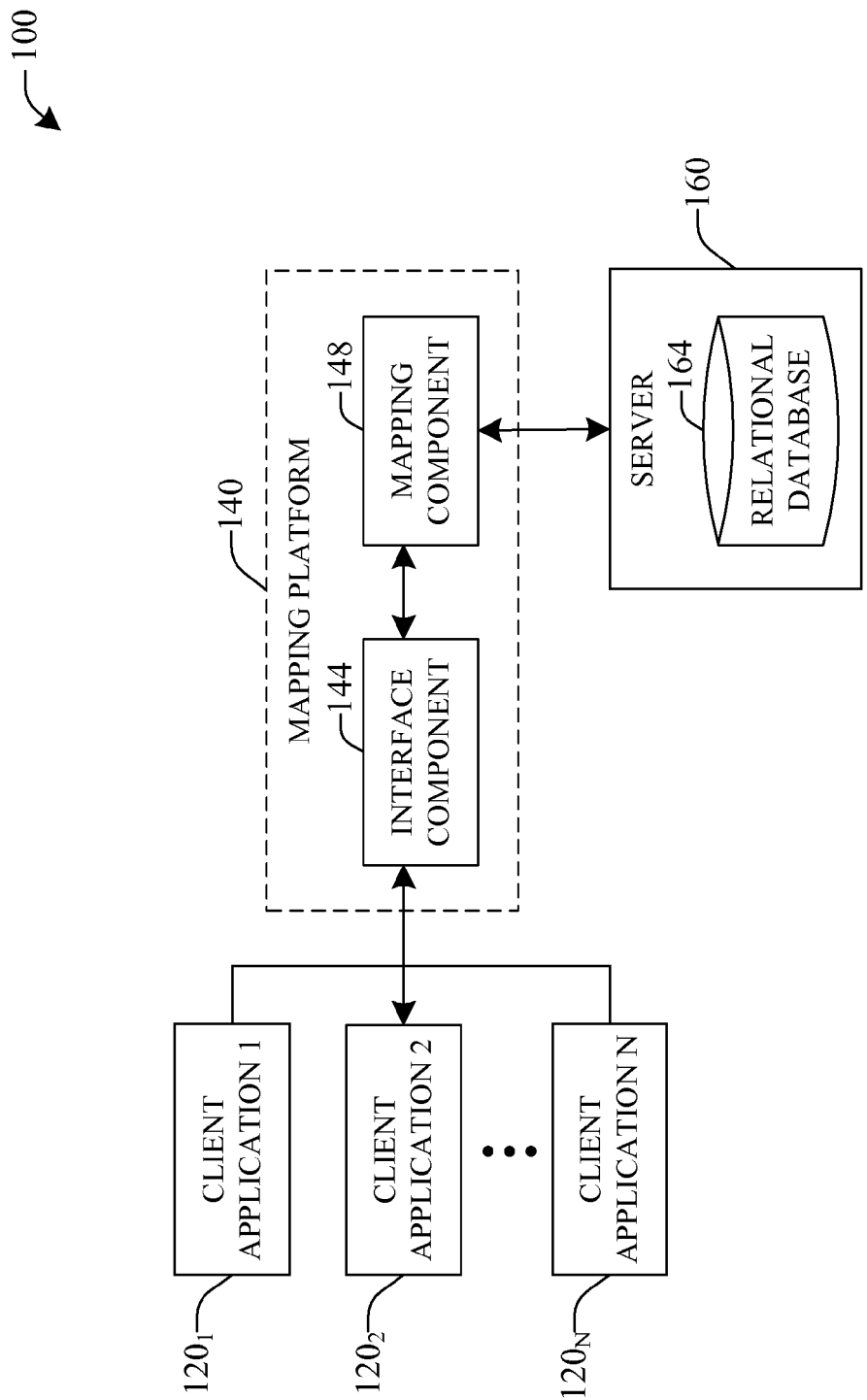
FIG. 1 is a block diagram of a system that facilitates object-relational mapping system between multiple client applications and a data server.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

FIG. 1 illustrates a block diagram of a system 100 that facilitates object/relational mapping between code objects in a plurality of client applications $120_1$-$120_N$ and a data server 160. Server 160 hosts a relational database 164. An intermediary mapping component 140 facilitates access to the data through an interface component 144 and a mapping component 148. In order to exploit intermediary platform 140, client applications $120_1$-$120_N$ can (i) be built on a language integrated query (LINQ)-enabled language. Such a feature enables developers to program client applications (e.g., $120_1$-$120_N$) that access data through queries instead of explicitly accessing data according to the physical data structure in database 164; e.g., reading a column/row of data. (ii) Employ substantially any object-oriented programming languages, e.g., Visual Basic®, Visual C#®, Perl, Python, C++, Java, Delphi (or Object Pascal), and need not utilize the same language. (iii) Adopt a common mapping format. Such common mapping format can be determined entirely by the mapping platform. Moreover, the mapping component can be inert to the details of the programming language/model of client applications $120_1$-$120_N$. As described in greater detail below, the intermediary platform 140 enables a concerted operation of a distributed framework in which client applications $120_1$-$120_N$ can be based on disparate programming models or languages and yet can access a common relational database 164, by adopting a common O/R mapping format. As a consequence, data can transition seamlessly between applications $120_1$-$120_N$. Additionally, software application developers and data server developers can continue to program in languages that reflect their core expertise, and maximize usage of their technological advantages over competitors, while interacting seamlessly through mapping component 140. In addition, vendors that employ client applications that adopt the common mapping format to access data servers can reduce/avoid the customization costs of accessing disparate data servers. By reducing the strategic impedance among vendors regarding application development and data usage, the intermediary component can generate advantageous economic interactions.

Regarding components of the mapping platform 140, interface component 144 (FIG. 1) identifies the programming language of client applications $120_1$-$120_N$. In addition, interface component 144 can have two other functions: (i) Validation. Check whether the programming language of the application whether the language is LINQ-enabled, and/or adheres to an object-oriented programming model. (ii) Run-time parsing/binding of (e.g., collection of) mapping information. Mapping can be specified using either attributes associated with classes, or an external mapping source [e.g., an XML (Extensible Markup Language) file]. In an aspect, both mechanisms can have equivalent functional features (see below). Attributes can have the advantage of explicitly connecting classes in the application code with mapping to a database (e.g., relational database 164). Additionally, attributes provide the simplest way to start and express most common mappings necessary for deployment of a client application (e.g., client application $120_K$, $1 \leq k \leq N$). On the other hand, mapping by attributes can restrict an application code to a specific mapping (e.g., the mapping is "hardwired" to the classes). External mapping, however, can add design versatility, e.g., by adapting the mapping to evolving classes in a program in development. Additionally, the mapping need not be determined by the existence of a specific class. Interface component 144 provides the mapping component 148 with mapping information. In turn, mapping component 148 (described in greater detail below) accesses relational database 164 according to the received mapping. Before accessing data, the mapping component conducts validation checks, and generates queries according the specific query language of (data) server 160. In one aspect, data server 160 can be Microsoft® SQL Server™. In another aspect, it can be IBM DB2, or PostgreSQL.

Figure 2:
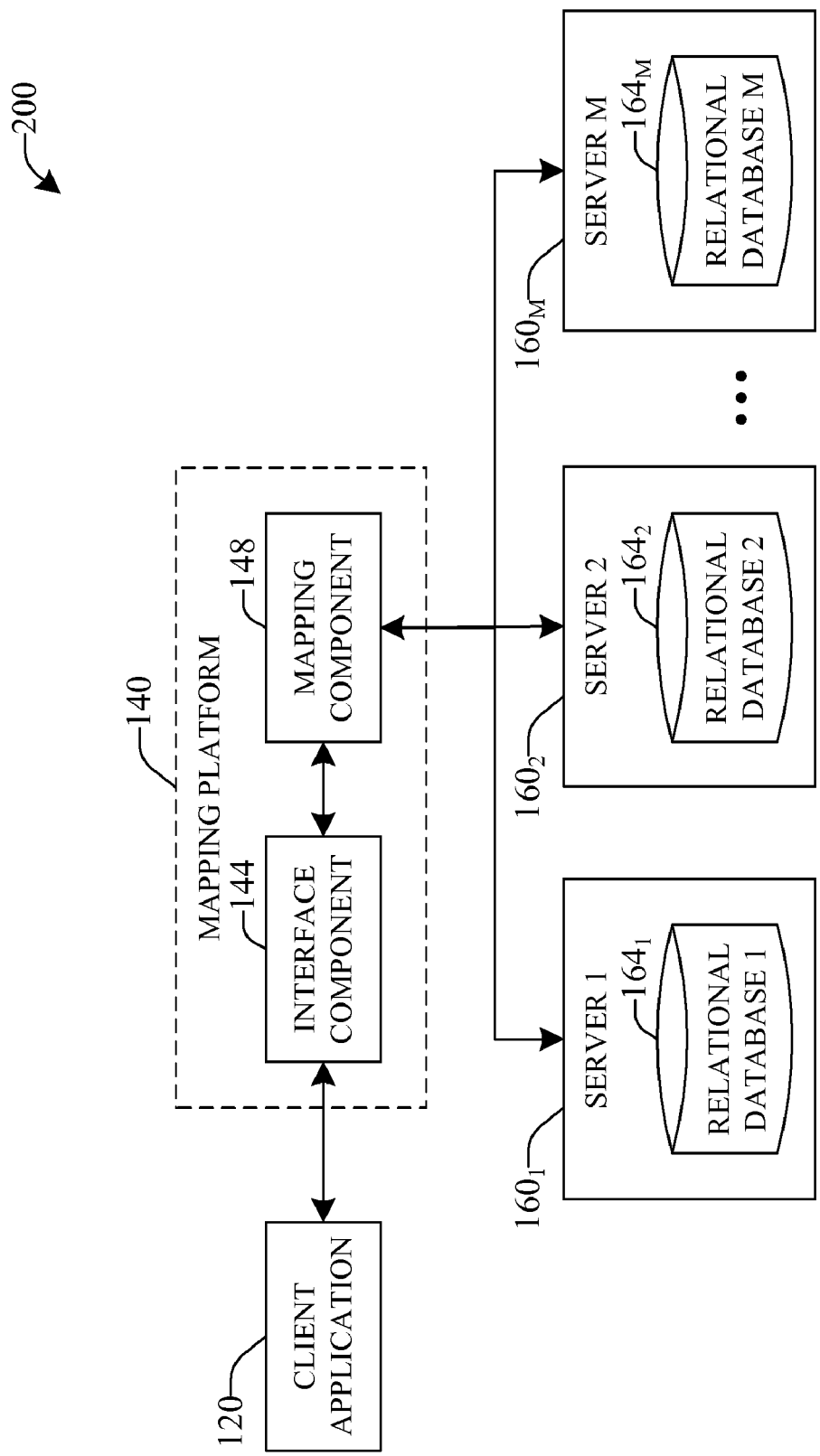
FIG. 2 is a block diagram of a system that facilitates object-relational mapping between a client application and multiple relational databases.

FIG. 2 illustrates a system 200 in which O/R mapping allows a client application 120 access to multiple relational databases $164_1$-$164_M$ deployed in a plurality of data servers $160_1$-$160_M$. Databases $164_1$-$164_M$ can be maintained and developed by disparate entities. In an aspect, client application 120 can be a web-based lending system servicing small businesses, and server $160_P$, server $160_S$, and server $160_Q$ can be data servers in credit reporting agencies, and server $160_J$ can be a data server in the Better Business Bureau. (Here $1 \leq P, S, Q, J \leq N$) By adopting the common mapping format proposition, client application 120 has seamless access to substantially disparate relational databases $164_P$, $164_S$, $164_Q$, and $164_J$, which can possess substantially different programming/querying models. It is noted that by adopting the mapping format of mapping component 140, client application 120 is inert to such disparity in programming/querying models; mapping platform handles the plurality of programming/querying models by translating LINQ-based queries generated by client application 120 into customized queries for servers 164$_P$, 164$_S$, 164$_O$, and 164$_J$.

It should be appreciated that in systems 100 (FIG. 1) and 200 (FIG. 2) communication between client application(s), mapping component, and server(s) can take place over substantially any communication framework, such as wide-area networks, local-area networks, and their wireless counterpart. Furthermore, a multiple application-data server system is possible, and it is within the scope of the present application.

Figure 3:
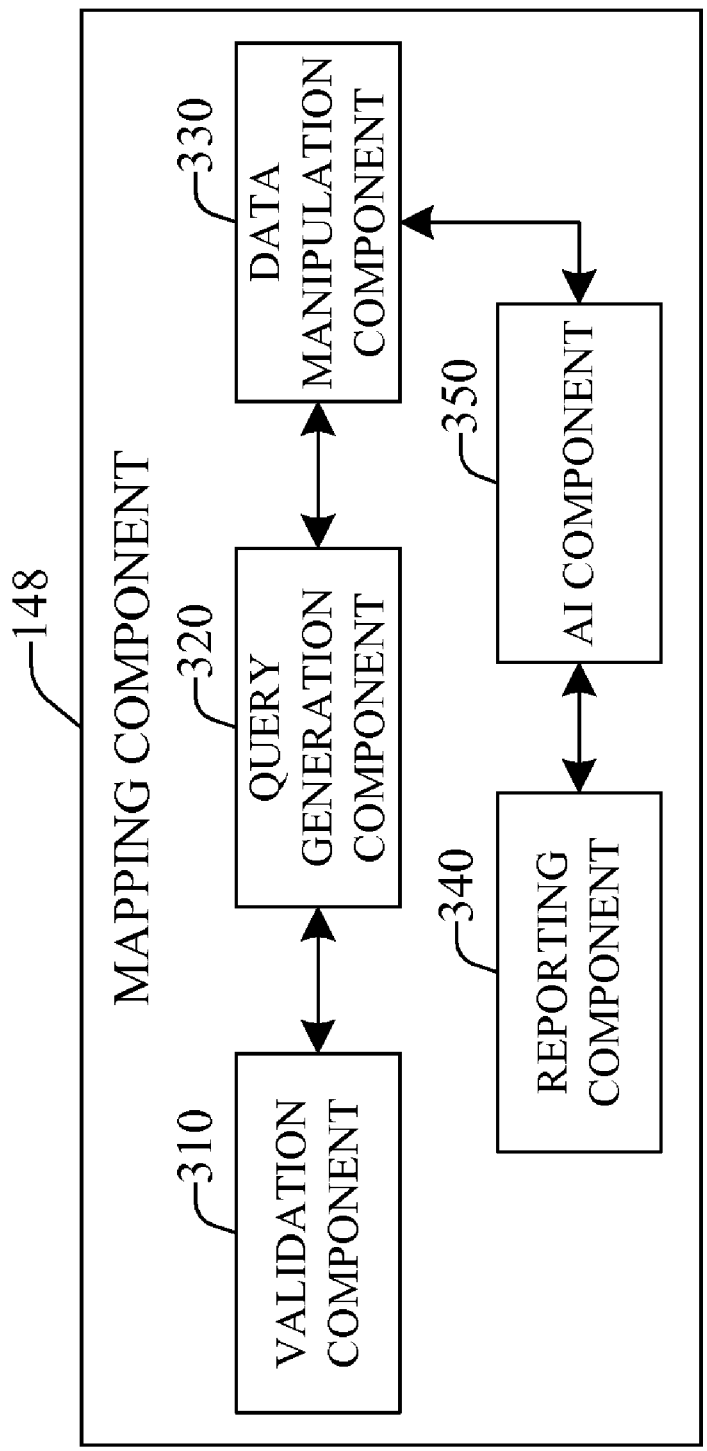
FIG. 3 is a granular block diagram of a mapping component that facilitates mapping in an object-relational mapping system.

Next, architectural details of mapping component 144 in accordance with aspects of the subject application are discussed. FIG. 3 displays a granular block diagram of mapping component 144, which can comprise a validation component 310, a query generation component 320, a data manipulation component 330, a reporting component 340, and an artificial intelligence component 350.

Validation component 310.—It can complement validation checks performed in interface component 144 (see above). Typically, validation component 310 can perform two categories of validation: Outward validation and inward validation. As employed herein, outward validation relates to checks regarding integrity of mappings employed by a client application, whereas inward validation relates to the checks regarding interaction of the mapping component with the database. An example of outward validation can be checking an external mapping file for format consistency, syntactic consistency, or for mapping consistency, e.g., requested mapping is supported, correct usage of properties of mapping attributes, multiple tables mapping to a same class, mapping to a non-existing table. Inward validation relates to database integrity checks such as normalization validation (e.g., check for update, insertion, and deletion anomalies after operating on a table according to a mapping), functional dependencies (modeled through foreign keys) validation, and concurrency controls. In an aspect, validation component can implement optimistic locking and collision detection when multiple applications access a relational database (e.g., 164$_N$) simultaneously and request to commit changes to such database.

Query generation component 320.—It can generate a query that can conform to the query programming model of the data server (e.g., server 160) where the queried relational database (e.g., database 164) resides. It should be appreciated that the data server can employ substantially any query enabled language, such as SQL, LINQ, XQuery, etc. When the client application submits a query in its LINQ-based language to the database at run-time, the query generation component 320 utilizes attribute-based mapping or external mapping identified by interface component 144 to translate such query into the query model of the data server, and generate the desired query.

Data manipulation component 330.—This component can generate operations of create, read, update and delete (CRUD) on relational database 164 based on the query programming model of the data server (e.g., server 160$_1$) and attribute-based or external mapping identified by interface component 144. When a client application (e.g., client application 120) requests committing changes to an underlying relational database (e.g., database 164$_1$), data manipulation component 330 submits the changes for saving to database, which again uses mapping to generate insert/update/delete commands according to server query language. Submitting changes for saving can allow to optimistic concurrency checking (via validation component 310) which can detect concurrent updates and deletions while objects are manipulated by disparate client applications. In an aspect, original values or timestamps are used to check if an object has been modified in a database since it was retrieved in CRUD operation initiated by data manipulation component 330. It is noted that insert operations are not subject to optimistic concurrency check since insertions are intended for new rows that do not have original values or timestamp. The class members and corresponding columns used for optimistic concurrency checks and their semantics are defined in the mapping specification (see below). In addition to manipulating data through CRUD operations, the data manipulation component 330 can employ stored procedures for one or more of the operations. Advantages of using procedural data manipulation can include the following. (a) Security. Stored procedures can be restricted to specific client applications (e.g., 120$_1$-120$_N$) and can perform security checks prior to execution (e.g., manipulation). (b) Procedural enforcement. Logic coded in stored procedures can be followed in substantially every manipulation instance. In addition, a stored procedure can have specific validations (which can be implemented, e.g., through validation component 310) and business logic that data server (e.g., server 160) administrators can desire to enforce. (c) Load management. By limiting access to predefined set of stored procedures, data server administrators can reduce load on database caused by ad hoc queries (generated, e.g., through query generation component 320) with uncertain performance characteristics. (d) Legacy practice based on performance characteristics of previous versions of the database.

It should be appreciated that validation component 310, query generation component 320, and data manipulation component 330 can also reside in a single component. Furthermore, it is noted that query generation component 320 can "probe" a database but it cannot manipulate relations present in a relational database (e.g., database 164). Such feature can be exploited when database integrity is an issue. In an aspect, selected client applications can utilize a relational database in "read-only" mode, wherein queries to the database are allowed but manipulation, via data manipulation component 330, is not permitted. In such instance, stand alone components 320 and 330 can be advantageous.

Reporting component 340.—It can provide appropriate status messages for queries, such as time elapsed and estimated time remaining to complete a query, and messages regarding concurrency control (e.g., "request to update denied: table or relationship is locked"); warnings or errors for mappings that are not supported and syntactical errors; error messages regarding integrity of a relational database (e.g., database 164); etc. In one aspect, every validation message issued by reporting component 340 can contain a description of the message, and severity of the message.

Artificial intelligence component 350.—AI component 350 can automate several aspects disclosed herein. AI can infer concurrency model to be implemented based on the utilization of the database. As an example, client applications (e.g., client application 120$_1$-120$_N$) that manipulate disparate tables, via data manipulation component 330 without incurring anomalies, can lead the AI component to switch from optimistic concurrency to overly-optimistic concurrency. In another aspect, AI component can assess usage load (e.g., small/large number of queries scheduled to operate on a specific set of tables, or simultaneous applications employing mappings that seek manipulation of subsets of rows, or tuples, in a specific table) of a relational database, such as database 164, and determine that a pessimistic concurrency model can be more appropriate for preserving data integrity. Additionally, AI component 350 can infer patterns (or relationships) in tables contained in a relational database and (i) generate classes and object-relational mapping information involving the generated classes and that reflect such patterns or relationships; (ii) submit findings to a reporting component in order to broadcast a message to client applications (e.g., client applications $120_1$-$120_N$) that can employ advantageously information on patterns. As an example, AI component 350 can identify homeowners with children attending college and broadcast, via reporting component 340, that information to a lending application offering home-equity mortgage loans and to an on-line air ticket booking application in order for such application initiate targeted marketing campaigns. Referring to (i), having access to classes depicting patterns in a relational database can be relevant for a client application that develops data models.

Here, the term "intelligence" refers to the ability to reason or draw conclusions about, e.g., infer, the current or future state of a system based on existing information about the system. Artificial intelligence (AI) can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, the AI component 248 can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Advantages of adopting a common mapping among client applications accessing a common, single or distributed relational database combined with a mapping component have been discussed. It should be appreciated that in the subject innovation, mapping platform 140 relies on a set of information items, or information entities, to effect a mapping. Such information items or entities can be regarded as the constitutive building blocks of a mapping, e.g., an information item can establish/convey that a particular column on a table is mapped to a specific class on object-oriented code, and can possess dependent information sub-items and/or properties. Moreover, these sub-items/entities and/or properties have a type (e.g., Boolean, string, integer, . . . ). In an aspect, a generalized tree-structure hierarchy of information items can be realized, wherein nodes and leafs can be added/removed depending on a desired specific mapping. It should further be appreciated that information items can adopt the form of an attribute in a class or a tag/entry in an XML-based file in order to accomplish establishing/conveying a mapping. Furthermore, an information item can adopt other forms of identification, such as a digital identifier, in order to describe a mapping; those forms of identification are within the scope of the subject matter. Hereinafter, an exemplary format for attribute-based mapping and an exemplary external mapping (wherein an information item takes the form of a tag) are discussed.

FIG. 4 illustrates a catalog 400 of exemplary attributes (or example information items) that support attribute-based object-relational mapping. Attributes specify how a class is mapped to a table. Hence, attributes (or information items) may be specific to a database provider. It should be appreciated that employing non-supported mappings, through non-supported attributes, can result in incorrect results, inconsistent data and/or data corruption when a mapping component (e.g., mapping platform 140) utilizes the non-supported mapping.

Provider attribute.—Indicates mapping platform 140 to perform provider-specific query translations, and specifies the type of the provider; e.g.,

[Provider(typeof (System.Data.Linq.SqlClient.Sql2000Provider))]

in the case of Microsoft® SQL Server™ 2000. Provider attribute can be specified for each data server (e.g., MySQL, PosgreSQL, Microsoft® SQL Server™ 2005) with which mapping platform 140 interacts.

Database attribute.—Specifies the default name of database. This attribute carries a Name property of String type, and is optional; if Database attribute does not exist on context declaration and one is not specified by the connection between mapping platform 140 and data server 160, then database is assumed to have the same name as the context class that is being mapped. Database attribute (or information item) is illustrated as follows.

```
[Database(Name="Database5")]
public class Database5 : DataContext {
    ...
}
```

Table attribute.—Designates a class as an entity class associated with (or mapped to) a database table or view. This attribute has a Name property and a String type. Name defines to which table in the database the class is mapped to. Mapping platform 140 treat classes with the Table attribute as persistent classes. An illustration follows.

```
[Table(Name="Customers")]
public class Customer {
    ...
}
```

It should be appreciate that restrictions apply on class to table mappings: (i) An entity class must be mapped to exactly one table, and (ii) a database table must not be used to map to multiple classes simultaneously. Here, an entity class can refer to a common language runtime (CLR) class mapped to a database table that has one or more members designated as identifiers (ID) (see below; Customer class).

Column attribute.—This attribute is used to designate a member of an entity class that represents a column in a database table or view. Thus, Column attribute maps a class member to a column in the relational database. It can be applied to any field or property. Only members identified as columns can be retrieved and persisted when mapping platform 140 saves changes to the database. Members without Column attribute are assumed to be non-persistent and not set upon materialization or submitted for inserts and updates. This attribute (or information item) has properties (or sub-items) of disparate types, such properties (or sub-items) and types are indicated below as (property, type), and succinctly described:

(A) (Name, String): The name of the column in the table or view.

(B) (Storage, String): The name of the underlying storage. If specified indicates mapping platform 140 how to bypass a public property accessor for a data member, and interact with the raw value itself. If property fails to be specified, mapping platform 140 gets and sets a value using the public accessor. Storage property is not intended for a public field and its use with public field results in an exception at the time validation component 310 conducts outward validation.

(C) (DBType, String): The type of database column specified using database types and modifiers. If not specified the database column type is inferred from the member type. The specific database type can only be necessary if mapping platform 140 is expected to be used to create an instance of the database, via data manipulation component 330.

(D) (Expression, String): Expression used for defining a computed column. Expression can be used by mapping platform 140—via, for example, data query generator component 320 in conjunction with data manipulation component 330— for defining a column as follows: Column_name AS expression. Example: Expression "Price*Quantity" can be used to build a column defined in SQL as Cost AS Price*Quantity.

(E) (CanBeNull, Boolean): If set to false, the data in the corresponding column is assumed to be non-null. This is duplicated from DBType for convenience and ease of use by other components (not shown) that can operate in conjunction with mapping platform 140.

(F) (IsPrimaryKey, Boolean): If set to true, class member represents (e.g., maps to) a column that is part of a table's unique key (e.g., the primary key). If more than one member of the class is designated as the ID, the key is said to be a composite key of the associated columns (e.g., a candidate key). For an entity class, at least one member must have this attribute and must be mapped to the primary key in a corresponding table/view. Otherwise, mapping component 140 can consider instances of the class as read-only for the purpose of submitting changes to the database (via, for example, data manipulation component 330). The set of columns identified with IsPrimaryKey need not be the primary key. Such columns are candidate keys which denote a set that uniquely identifies the entity.

(G) (IsDBGenerated, Boolean): Identifies that the member's column value is automatically generated by the database. Members with IsDBGenerated=true are synchronized immediately after the data row is inserted and are available after data manipulation component 330 commits changes.

(H) (IsVersion, Boolean): Identifies the member's column type as a database timestamp or a version number. Version numbers are incremented and timestamp columns are updated every time the associated row is updated, e.g., through data manipulation component 330. Members with IsVersion=true are synchronized immediately after a data row is updated. New values are visible after data manipulation component 330 commits changes.

(I) (ISDiscriminator, Boolean): Determines if a class member holds the discriminator value for an inheritance hierarchy. This can be set to true for at most one member of the topmost mapped class in a hierarchy.

(J) (UpdateCheck, UpdateCheck): Determines how the mapping component implements optimistic concurrency conflict detection. If no member is designated as IsVersion=true, detection is done by comparing original member values with current database state. Control of which members mapping platform 140 can use during conflict detection, can be accomplished by giving each member an UpdateUheck enum value as follows. Always—always use this column for conflict detection Never—never use this column for conflict detection WhenChanged—only use this column when the member has been changed by a client application (e.g., client application 120).

Association attribute.—This attribute is used to designate a property that represents a database association like a foreign-key to primary-key relationship. Similar to the case of Column attribute, Association attribute (or information item) has properties (or sub-items) of disparate types, such properties and types are indicated below as (property, type), and succinctly described:

(1) (Name, String): The name of the association. Typically this is the database's foreign-key constraint name. It can be used when data manipulation component 330 is used to create an instance of the database in order to generate the relevant constraint. It can also be used to help distinguish between multiple relationships in a single entity class referring to the same target entity class.

(2) (Storage, String): The name of the underlying storage member. If specified it indicates mapping component how to bypass a public property accessor for a data member and interact with the raw value itself. Herein, it is adopted that all association members be properties with separate storage members identified.

(3) (ThisKey, String): A comma separated list of names of one or more members of this entity class that represent the key values on this side of the association. Key is not required to match primary key or foreign key but the user-stated cardinality (0-1 for EntityRef<T> or 0-n for EntitySet<T>; see below) is assumed to be true.

(4) (OtherKey, String): A comma separated list of names of one or more members of a target entity class that represent key values on the other side of the association. Key is not required to match primary key or foreign key but the user-stated cardinality (0-1 for EntityRef<T> or 0-n for EntitySet<T>) is assumed to be true.

(5) (IsUnique, Boolean): True if there is a uniqueness constraint on the foreign key, indicating a true 1:1 relationship.

(6) (IsForeignKey, Boolean): True if the class member refers to the parent; e.g., the "other" type of the association is the parent of the source type. With foreign-key to primary-key relationships, the side holding the foreign-key is the child and the side holding the primary key is the parent.

Inheritance attribute.—The InheritanceMapping attribute is used to map an inheritance hierarchy. One InheritanceMapping attribute is specified per mapped class an inheritance hierarchy. Properties (or information sub-entities) and types are the following.

(i) (Code, String): The discriminator code value. This value must be of the type of the discriminator or must be convertible to that type.

(ii) (Type, Type): Type of the class in the hierarchy. This may be any non-abstract type in the inheritance hierarchy including the root type.

(iii) (IsDefault, Boolean): If the discriminator value in the store does not match one of the specified values, then an object of this type is instantiated. Exactly one of the InheritanceMapping attributes must be declared with IsDefault as true.

Illustrations of attribute-based mapping are presented next. A Customer class is mapped by attribute:

```
[Table(Name="Customers")]
public class Customer
{
    [Column(IsPrimaryKey=true)]
    public string CustomerID;
    ...
    private EntitySet<Order> _Orders;
```

-continued

```
        [Association(Storage="_Orders",
OtherKey="CustomerID")]
            public EntitySet<Order> Orders {
                get { return this._Orders; }
                set { this._Orders.Assign(value); }
            }
    }
```

The Table attribute on class Customer defines to which table in the database the customer type is mapped. The Column attribute on the CustomerID field specifies that the column with the same name in the Customers table is the primary key for that table. Finally, the Association attribute on the orders property specifies that the private field_Orders contains an EntitySet that represent that one-to-many relationship that exists between Customers and Orders via the primary-foreign key relationship Customers.CustomerID (the one side) and Orders.CustomerID (the many side).

An orders class is mapped by attribute.

```
        [Table(Name="Orders")]
        public class Order
        {
            [Column(IsPrimaryKey=true)]
            public int OrderID;
            [Column]
            public string CustomerID;
            private EntityRef<Customer> _Customer;
                [Association(Storage="_Customer",
ThisKey="CustomerID")]
                    public Customer Customer {
                        get { return this._Customer.Entity; }
                        set { this._Customer.Entity = value; }
                    }
        }
```

Similarly, the Table attribute on the order class defines that this type is mapped to the Customers table in the database; the Column attribute on CustomerID specifies that this field is mapped to a corresponding column in the Customers table; and the Association attribute on the Customer property specifies the many-to-one relationship between Orders and Customers via the foreignkey Orders.CustomerID and the primary key in Customers.CustomerID.

Figure 5:
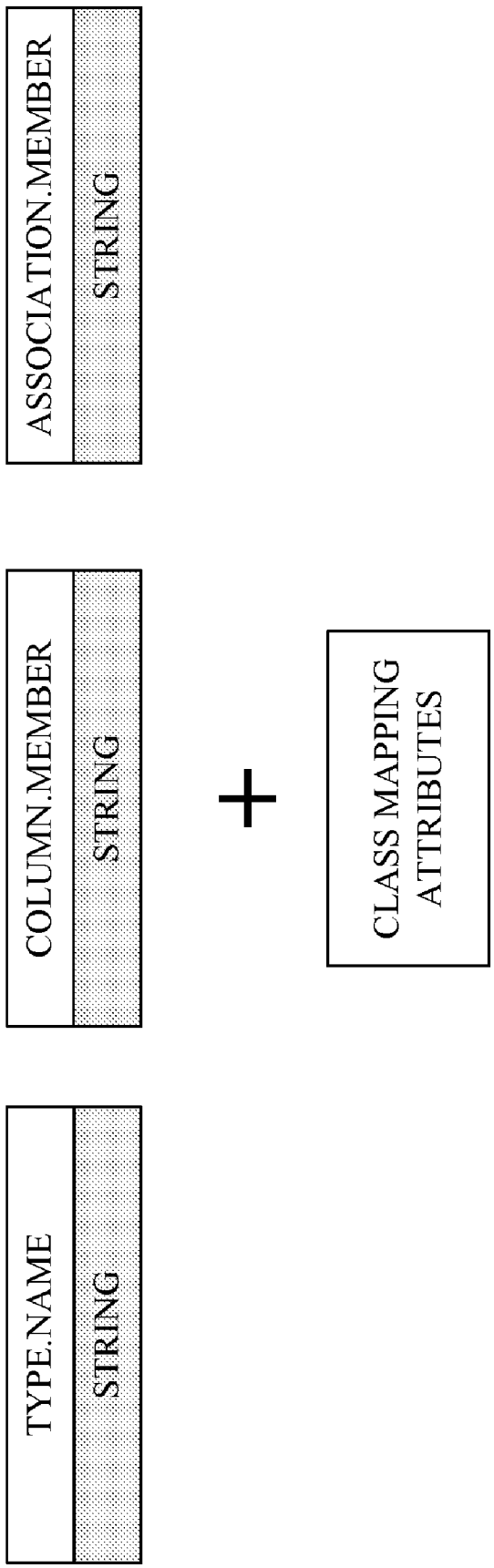
FIG. 5 illustrates a catalog of attributes available to support external mapping.

Alternatively, the same information above can be specified in an external mapping source, wherein the information entities or items that characterize a mapping take the form of entries in a file; such mapping source specifies both the metadata of the SQL database (tables, columns and their types) as well as the mapping between the tables and classes, columns and members, and associations and EntitySet<T> and EntityRef<T> properties. FIG. 5 illustrates an exemplary catalog 500 of attributes (or information items/entities) available to support external mapping. External mapping supports all the features available through attributes (e.g., information items/entities that adopted the form of an attribute). Hence, the feature descriptions supra apply to external mapping as well. External mapping source can be specified in the form of a file (e.g., XML file) and can be provided as an external mapping source that in turn takes an XML file or an Xml-Reader. Additionally, the external mapping format can be transmitted wirelessly, e.g. using short message service (SMS), to a mapping platform such as mapping platform 140. It should be appreciated that a mapping provided externally can be required to be valid against a predefined format established by the mapping platform. As discussed above, a common mapping is the instrument that allows concerted access to relational database(s) by client application(s). Below an exemplary one such a format is presented. It should be further appreciated that validation component 310 can enforce format validation of substantially any standard adopted by a mapping platform.

In an aspect, when external mapping is supplied, such mapping overrides the attribute-based mapping. When interface component 144 parses/binds an external mapping, it ignores mapping attributes on a class regardless of whether the class is in the external mapping or not. It should be appreciated that, in another aspect, a hybrid use of attribute-based mapping and external mapping can be utilized by the mapping platform. External mapping can be specific to each data server (or database provider); thus, in an aspect, client application 120 in system 200 can affect multiple external mappings, which can comply with multiple formats, embodied in a computer-readable medium, in order to access the plurality of databases $164_1$-$164_M$. In such scenario, the same classes present in client application 120 can observe disparate mappings for separate providers.

In addition to mapping attributes discussed supra in the context of attribute-based mapping, external mapping possesses the following attributes (or information entities/items).

(a) (Type.Name, String): Name of a class. Equivalent to the name of the class that carries the Table attribute in attribute-based mapping. The type name may be optionally assembly qualified. The specified type name must be unique in a client application domain that uses Type.Name in external mapping. In an aspect, multiple simultaneous versions of the same type, distinguished by a version number, in a single client application can be supported.

(b) (Column.Member, String): Name of the class member mapped to the column. Equivalent to the name of the class member that carries the Column attribute in attribute-based mapping.

(c) (Association.Member, String): Name of the class member that represents the association. Equivalent to the name of the class member that carries the Association attribute in attribute-based mapping.

Below, an illustration of external mapping file is illustrated with a markup schema:

```
<Database Name="Northwind">
    <Table Name="Customers">
        <Type Name="Customer">
            <Column Name="CustomerID"
            Member="CustomerID"
            Storage="CustomerID"
            DbType=" NChar(5) NOT NULL"
            CanBeNull="False"
            IsPrimaryKey="False"
                IsDBGenerated="False" />
            ...
                <Association Name="FK_Orders_Customers"
            Member="Orders"
            Storage="_Orders"
                OtherTable="Orders"
                OtherKey="CustomerID" />
        </Type>
    </Table>
    <Table Name="Orders">
        <Type Name="Order">
            <Column Name="OrderID"
            Member="OrderID"
            Storage="OrderID"
                DbType="Int NOT NULL IDENTITY""
            CanBeNull="False"
            IsPrimaryKey="True"
```

-continued

```
        IsDBGenerated="True" />
    <Column Name="CustomerID"
        Member="CustomerID"
        Storage="CustomerID"
        DbType=" NChar(5) NOT NULL"
        CanBeNull="False"
        IsPrimaryKey="False"
            IsDBGenerated="False" />
        ...
            <Association Name=" FK_Orders_Customers"
        Member="Customer"
            Storage="_Customer"
        ThisKey="CustomerID"
        OtherTable="Customers"
        OtherKey="CustomerID"
        IsForeignKey="True" />
    </Type>
   </Table>
    ...
</Database>
```

It should be noted that in such a single schema two classes have been mapped through attributes, e.g., the use of Association attribute and IsPrimaryKey and IsForeignKey. Additionally, metadata about the table is also present in the form of attributes describing the table.

Figure 6:
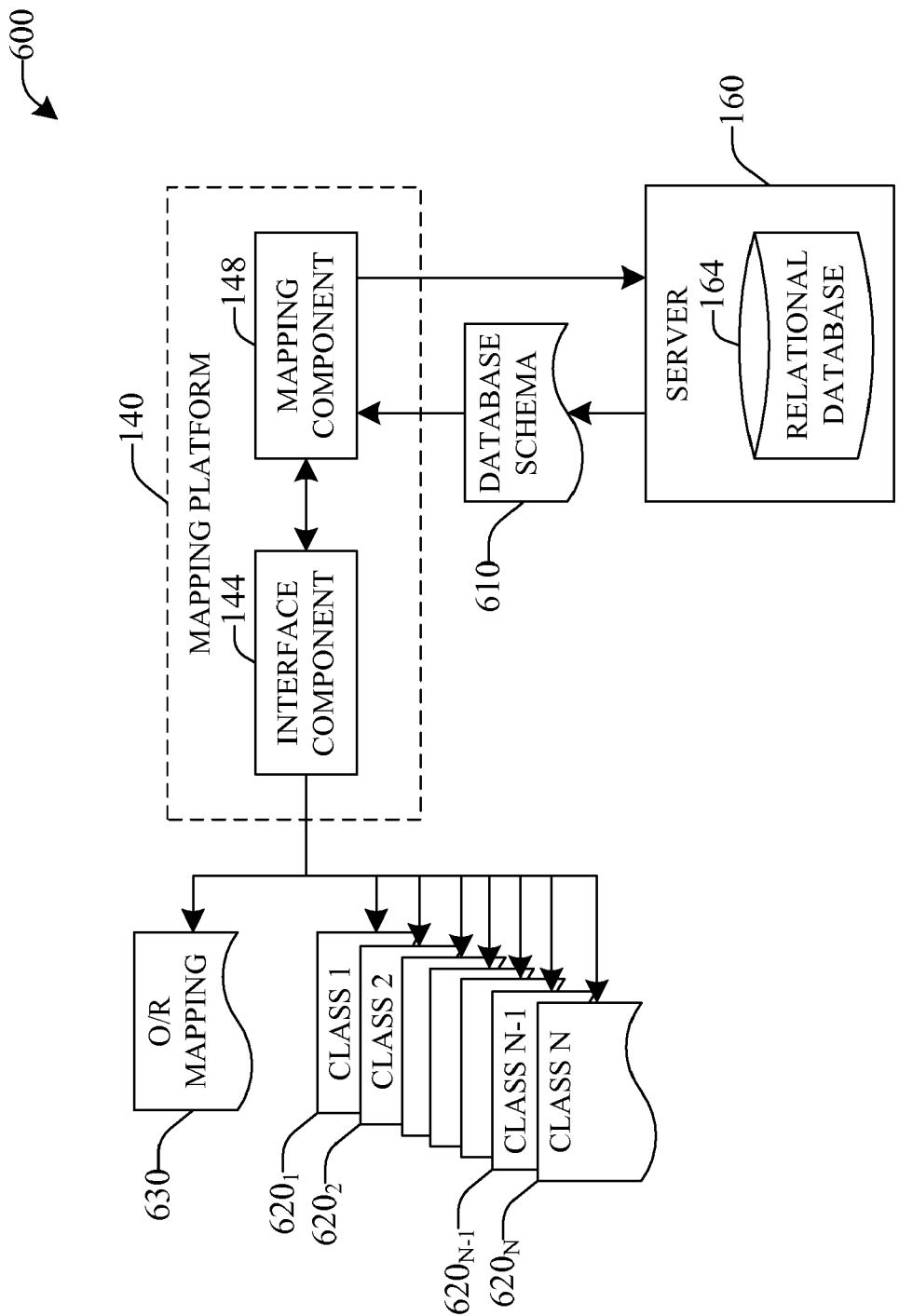
FIG. 6 is a block diagram of a system that exploits the external database schema to generate classes and objection-relational mappings.

FIG. 6 illustrates a system 600 that exploits the external database schema to generate classes and mappings via a mapping platform 140. A mapping component 148 queries (employing, for example, query generation component 320) a relational database 164 and generates a database schema 610. The database schema in an external format (e.g., XML format describe above), where metadata about the underlying structure of the relations in database 164 coexist with mapping information. In an aspect, metadata and mapping information are characterised with attributed described above. It is noted, however, that database schema 610 can be cast in any format that depicts metadata in conjunction with mapping information. Such format can depend on the native language of data server 160. In system 600, mapping component 148 receives data schema and generates classes 620$_1$-620$_N$ that represent tables, relationships and stored procedures in relational database 164. Additionally, mapping component 148 creates the associated O/R mapping—either embedded as attributes, or as an external mapping file. It should be appreciated that more than one external mapping files can be generated, depending on complexity of relational database 164.

Figure 7:
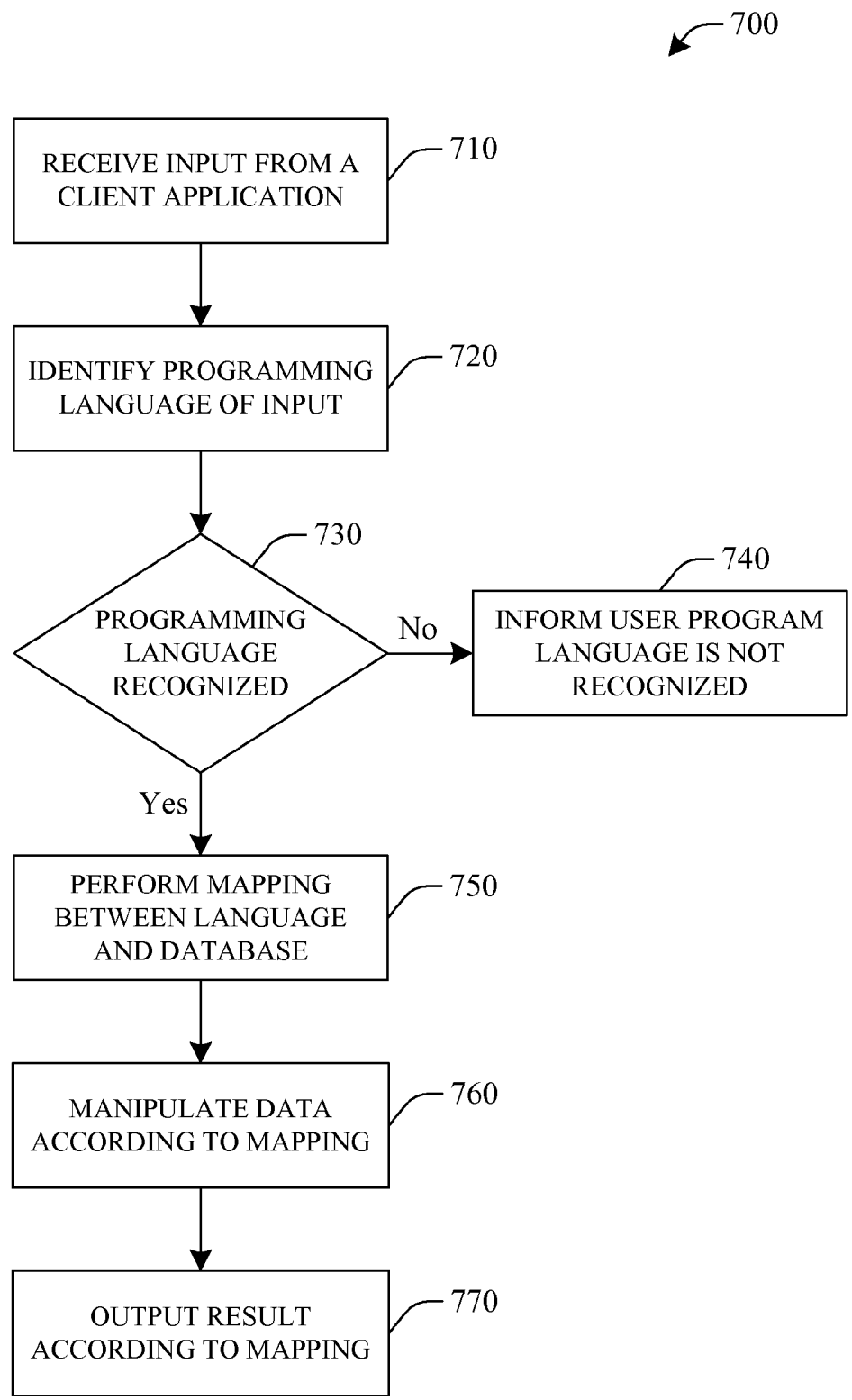
FIG. 7 presents a flowchart of a method to facilitate object-relational mapping of a relational database, and access to the database based on such mapping.
Figure 8:
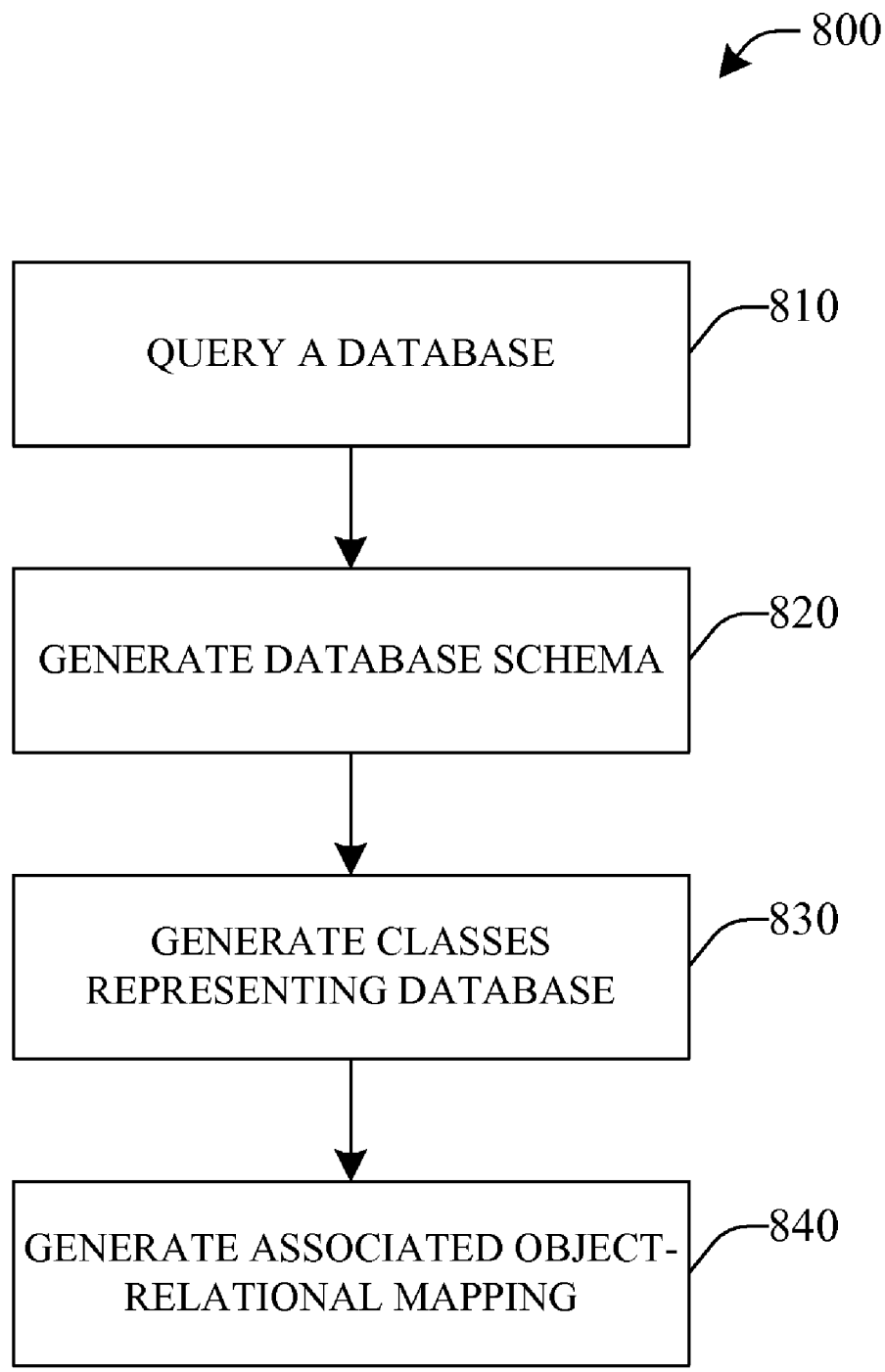
FIG. 8 is a flowchart of a method to facilitate generation of a class and an object-relational mapping.

FIGS. 7 and 8 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 7 presents a flowchart of a method 700 to facilitate object-relational mapping of a relational database, and access to the database based on such mapping. At act 710, input is received from a client application (e.g., client application 120). Programming language of the application is identified at 720. In an aspect, identification can be carried out by interface component 144. 730 is an act that checks whether the language of the client application is recognized as to being LINQ-enabled and/or coded within an object-oriented model. If the detected language is not recognized as such, the user is so informed at act 740. In case the language is recognized, mapping between the programming language and the database is performed at 750. Manipulation of the data in the relational database according to the mapping takes place at act 760, and results are output according to the mapping.

FIG. 8 illustrates a flowchart of a method 800 to facilitate generation of a class and an object-relational mapping. At 810, a relational database is queried. In an aspect, the query language can be the query language of the data server (e.g., server 160) that hosts the relational database (e.g., relational database 164). At act 820, a database schema of the underlying database structure is generated. The database schema can contain the relations structure of the database, relationships (primary key-foreign key) and stored procedures. At act 830 one or more classes are generated reflecting the database schema. Tables can be mapped to entity classes and columns can be mapped to members of a class or classes. An object-relational mapping (or mapping information) is generated at 840. The mapping relates the newly created classes with the tables, relationships, and procedures in the relational database.

Figure 9:
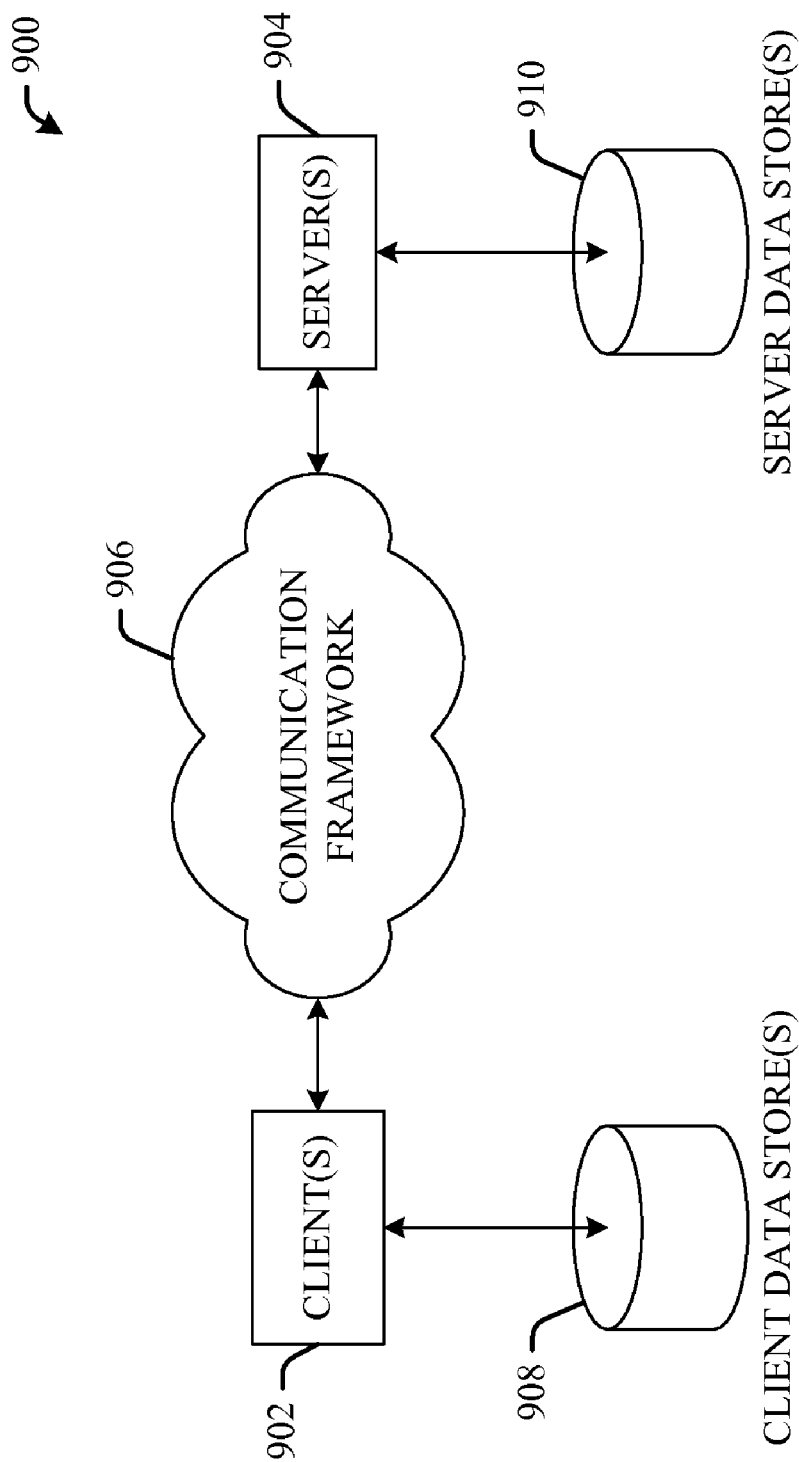
FIGS. 9 and 10 illustrate computing environments for carrying out various aspects described herein.

FIG. 9 illustrates a schematic block diagram of a computing environment 300 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Figure 10:
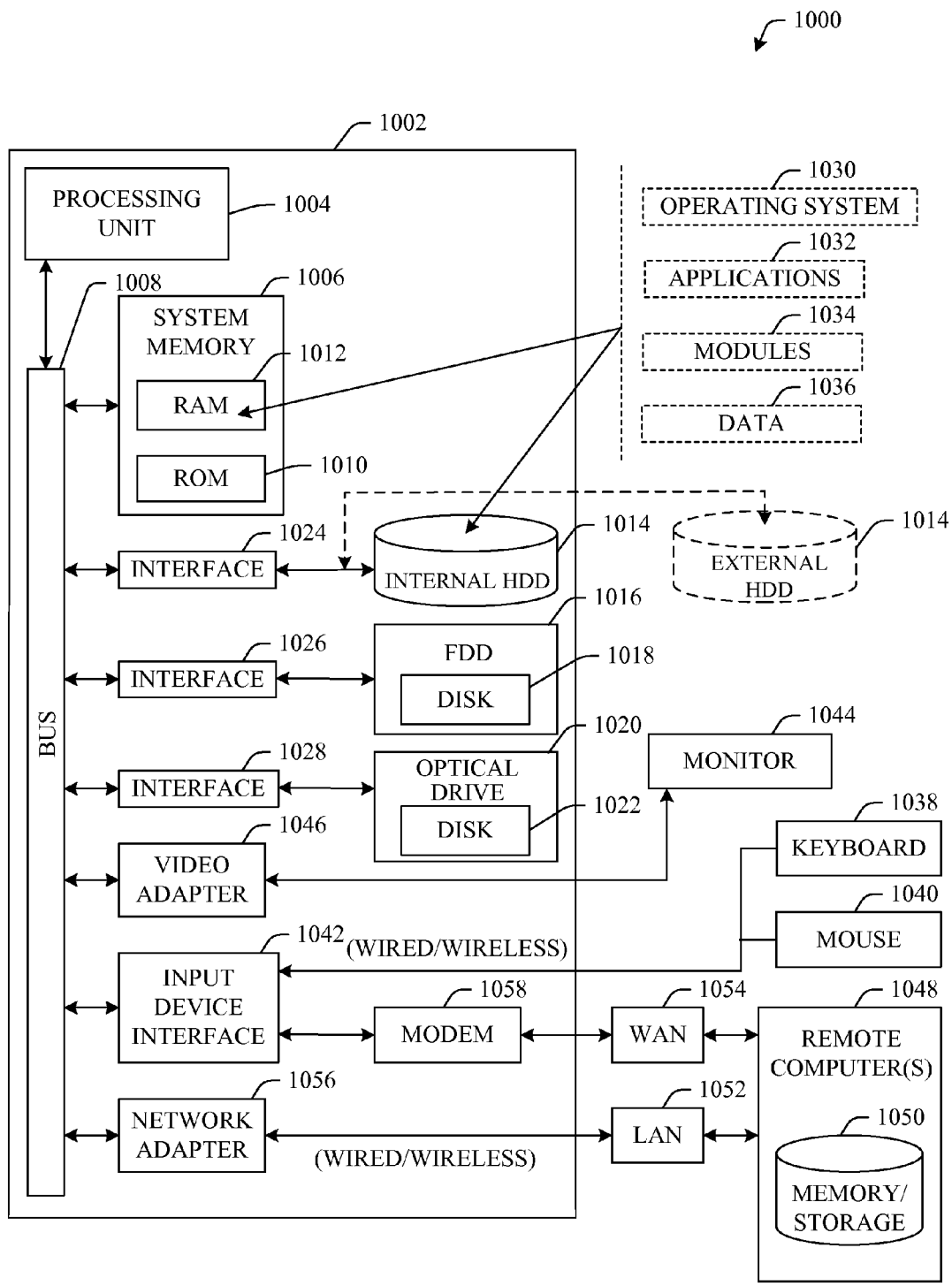

FIG. 10 illustrates a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 408 via an interface, such as a video adapter 1046. In addition to the monitor 444, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system that facilitates access to and manipulation of a relational database from a client application, comprising
    an interface component that detects a programming language of the client application, and collects information on an object-relational mapping between the objects in the programming language of the client application and the relational database, the object-relational mapping including:
        an association class that represents a foreign-key to primary-key relationship in the relational database, wherein the association class includes:
            a first property including a list of the key values on a first side of the foreign-key to primary-key relationship in the relational database;
            a second property including a list of the key values on an opposing second side of the foreign-key to primary-key relationship in the relational database;
            a third property including the name of the foreign-key constraint in the relational database; and
            a fourth property that indicates whether there is a uniqueness constraint on the foreign key; and
    a mapping component that facilitates the access and manipulation of the relational database by employing a common object-relational mapping format that facilitates mapping classes of the programming language of the client application to tables in the relational database.

2. The system of claim 1, the interface component collects the information on the object-relational mapping from an external file.

3. The system of claim 2, further comprising a validation component that checks the external file for format consistency.

4. The system of claim 3, the validation component further checks the information on the object-relational mapping defines a supported mapping.

5. The system of claim 1, further comprising a query generation component that employs the information on the object-relational mapping to generate queries that conform to the query programming model of the relational database.

6. The system of claim 1, further comprising a data manipulation component that creates, reads, updates and deletes data in the relational database based on a query programming model of the relational database and collected object-relational mapping information.

7. The system of claim 6, the data manipulation component submits changes for saving to the relational database based on the collected mapping information when the client application requests committing changes to the relational database.

8. The system of claim 1, further comprising an artificial intelligence component that infers relationships in tables contained in the relational database and generates one or more classes and an object-relational mapping involving the generated classes.

9. A computer-implemented method that facilitates access to and manipulation of a relational database from a client application, comprising:
    detecting a programming language of the client application;
    collecting information on an object-relational mapping between an object in the client application programming language and the relational database, the object-relational mapping including:

an association class that represents a foreign-key to primary-key relationship in the relational database, wherein the association class includes:
   a first property including a list of the key values on a first side of the foreign-key to primary-key relationship in the relational database;
   a second property including a list of the key values on an opposing second side of the foreign-key to primary-key relationship in the relational database;
   a third property including the name of the foreign-key constraint in the relational database; and
   a fourth property that indicates whether there is a uniqueness constraint on the foreign key; and
employing a file format to facilitate mapping an object of the programming language to tables in the relational database.

10. The method of claim 9, further comprising generating a relational database schema to generate classes that represent the relational database.

11. The method of claim 10, further comprising employing the relational database schema to generate information on an object-relational mapping.

12. The method of claim 9, the mapping information includes an information item that maps a class of the programming language to a table or view in the relational database.

13. The method of claim 12, the information item adopts the form of a Table mapping attribute, with a Name property of the String type, wherein the Name property defines to which table in the database the class is mapped to.

14. The method of claim 9, the mapping information includes an information item that maps a member of a class of the programming language to a column in the relational database.

15. The method of claim 14, the information item has a sub-item of Boolean type that, when set to true, the mapped class member maps to a column that is part of the unique key of the relational table.

16. The method of claim 9, the file format includes an information item that indicates the name of a class of the programming language.

17. The method of claim 9, the file format includes an information item that indicates the name of a class member mapped to a column in the relational database.

18. The method of claim 9, the file format includes an information item that indicates the name of a class member that represents an association.

19. A computer readable medium having computer executable instructions stored thereon for performing the following acts:
   collecting information on an object-relational mapping between a client application and a relational database;
   validating the integrity of the information on the object-relational mapping, the object-relational mapping including:
      an association class that represents a foreign-key to primary-key relationship in the relational database, wherein the association class includes:
         a first property including a list of the key values on a first side of the foreign-key to primary-key relationship in the relational database;
         a second property including a list of the key values on an opposing second side of the foreign-key to primary-key relationship in the relational database;
         a third property including the name of the foreign-key constraint in the relational database; and
         a fourth property that indicates whether there is a uniqueness constraint on the foreign key; and
   employing a file format to convey the information on the object-relational mapping, the object-relational mapping facilitates mapping classes of a programming language of the client application to tables in the relational database.

\* \* \* \* \*